United States Patent Office 3,766,133
Patented Oct. 16, 1973

3,766,133
POLYTETRAFLUOROETHYLENE FILLED AND UNFILLED MOLDING POWDERS AND THEIR PREPARATION
Robert Roberts and Roland Fitzhugh Anderson, Wilmington, Del., assignors to E. I. du Pont de Nemours and Company, Wilmington, Del.
No Drawing. Continuation-in-part of abandoned application Ser. No. 307,318, Sept. 9, 1963. This application July 16, 1971, Ser. No. 163,510
Int. Cl. C08f 3/24, 45/04
U.S. Cl. 260—41 R                    15 Claims

ABSTRACT OF THE DISCLOSURE

Improving powder flow of finely ground polytetrafluoroethylene resin by deagglomeration and controlled dry or wet reagglomeration. The products are agglomerates of filled or unfilled finely ground polytetrafluoroethylene resins having an apparent density of 400 to 1100 grams per liter and a powder flow index of at least 4 grams per second.

PRIOR APPLICATION

This application is a continuation-in-part of our application Ser. No. 307,318, filed Sept. 9, 1963 now abandoned.

SUMMARY OF THE INVENTION

The present invention relates to the preparation of polytetrafluoroethylene powders having excellent moldability and to novel polytetrafluoroethylene molding powders having a unique combination of properties including excellent moldability and powder flow.

BACKGROUND OF THE INVENTION

Polytetrafluoroethylene powders hitherto made available have been of two general kinds, i.e., (1) polytetrafluoroethylene fine powders obtained by polymerizing tetrafluoroethylene in an aqueous medium containing a free radical initiator and a telogenically inactive dispersing agent to obtain an aqueous colloidal dispersion of polymer particles, and coagulating the dispersion, as disclosed, for example, in Berry, U.S. Pat. No. 2,559,752, issued July 10, 1951 and Lontz, U.S. Pat. No. 2,593,583, issued Apr. 22, 1952; and (2) polytetrafluoroethylene granular powders obtained by procedures comprising polymerizing tetrafluoroethylene in contact with an aqueous medium containing a free radical initiator to obtain a slurry of polymer particles in non-water-wet form, as disclosed, for example, in Brubaker, U.S. Pat. No. 2,393,967, issued Feb. 5, 1946 and Anderson, Edens and Larsen, U.S. Pat. No. 3,245,972, issued Apr. 12, 1966.

The fine powders have not been suitable for general molding, inasmuch as they tend to crack when preformed and free-sintered in attempts to make massive articles, and inasmuch as they exhibit poor powder flow properties rendering them difficult to process in automatic molding machines. Although it has been found possible to minimize the cracking tendency of fine powders by special techniques, as disclosed, for example, in Thomas U.S. Pat. No. 3,010,950, issued Nov. 28, 1961, these techniques further impair the flow properties of the powder.

The granular powders on the other hand have usually manifested poor moldability properties, such that relatively high pressures have been required in pressing into preforms which will free-sinter to substantially void-free articles. Again, while it has been found possible by special techniques to improve the moldability of such powders, as disclosed, for example, in Thomas et al. U.S. Pat. No. 2,936,301, issued May 10, 1960, these techniques also impair the flow properties of the powders, so as to make them difficult if not impossible to process on automatic molding machines. Further, while it has been found possible to effect limited improvement in the flow properties of polytetrafluoroethylene powders by special techniques, as disclosed, for example, in Cheney U.S. Pat. No. 2,456,621, issued Dec. 21, 1948, such treatments so impair the moldability of the powders that it has not been possible through their use to convert the highly moldable, poorly flowing powders hitherto made available into powders having a desirable combination of powder flow and moldability properties. Moreover, in general, the special procedures above described for the preparation of highly moldable powders have been considerably more expensive than the procedures required for preparing powders of ordinary moldability properties.

THE INVENTION

In accordance with the present invention, there are provided novel procedures for preparing polytetrafluoroethylene granular molding powders having both a high degree of moldability and improved powder flow.

The "standard specific gravity" (SSG) of the polytetrafluoroethylene as referred to hereinafter is determined by a modified procedure based upon ASTM D–1457–62T now known as ASTM D–1457–69. The modifications of ASTM D–1457 procedure were made to correct its deficiencies. The procedure employed comprises the use of a 12-gram sample of polytetrafluoroethylene powder preformed at 5000 p.s.i. in a mold 1⅛" in diameter. The preform is placed in an oven preheated to 300° C. The temperature of the oven is then raised to 380° C. at the rate of 2° C. per min. The temperature of the oven is maintained at 380° C. for 30 min. and the oven is then cooled to 295° C. at a rate of 1° C. per min. The temperature is maintained at 295° C. for 25 min. after which the test specimen is removed, allowed to cool to room temperature and the SSG determined as described in ASTM 792–66.

The term "moldability index" (ΔSG) as used herein refers to the difference between the SSG of the polytetrafluoroethylene, as described above, and the specific gravity of a sample of the same powder determined in the same way except that the powder is preformed at 2000 pounds per square inch pressure instead of the 5000 pounds per square inch pressure, the difference between the two specific gravities being multiplied by 1000 to obtain the moldability index.

The term "apparent density" (AD), as used herein, is also a value obtained by a procedure described in ASTM D–1457–62–T, now known as ASTM D–1457–69 without separating and reconstituting the sample.

The "compaction ratio" (CR) of the molding powder is the ratio of the volume occupied by the powder prior to molding to that occupied by the dense molded product. For unfilled powders, the compaction ratio equals 2150/apparent density. For filled compositions, the compaction ratio equals 1000 times the true density/apparent density. The true density of the filled compositions is dependent upon the type and concentration of the filler employed.

"Tensile strength" (TS) and "ultimate elongation" (E) as set forth hereinafter are determined in accordance with ASTM D–1457–62–T, now known as ASTM D–1457–69, but using the modified thermal cycle as described above under standard specific gravity.

The term "crushing factor" (CF) as used herein is a characteristic of particle hardness as determined by a modification of ASTM B–330–58T, now known as ASTM B–330–65, which describes the determination of "sub-sieve size" (SSS). In this test, the sub-sieve size of a 2.28 g. unfilled sample is determined as a function of the porosity of the partly compressed bed of powder used in the determination. For filled compositions the sample size is adjusted to equal the weight in grams of the true density of the void free composition. A plot is made of the measured sub-sieve size as a function of the porosity. Finely ground unagglomerated materials give essentially a horizontal line because the sub-sieve size is independent of the porosity in such materials. Agglomerates give a line in which the subsieve size changes with a change in porosity of the test specimen; the slopes of a series of relationships thereof increasing with the resistance of the agglomerate to crushing during compression. The crushing factor equals 1/10 the slope of the curve measured at the point where the porosity is 0.55.

In determining the SSS, a sample is introduced into the test tube and packed by turning the pinion knob until the pointer coincides with the intersection of the sample height and the desired porosity line. The Fineness Determination reading is made after there has been no change in height of the water level in the manometer tube for at least two minutes. After a reading is recorded, the sample tube is replaced in the compression assembly and compressed to a lower porosity. This procedure is repeated for porosity values of 0.70, 0.65, 0.60, 0.55, 0.50, and 0.45.

With some samples, especially those of very high apparent density, meaningful readings are not obtained at the highest levels of porosity. With other samples, especially materials having very hard particles or agglomerates, excessive pressure is required to compact the sample and it is not possible to reduce the porosity below about 0.50.

"Average agglomerate size" ($d_{50}$) and distribution are determined by the wet sieving procedure of ASTM D-1457-62-T, now known as ASTM D-1457-69. "Powder flow" (PF) is determined by the procedure described in U.S. Pat. No. 3,087,921, issued Apr. 30, 1963, except that frequency of vibration is 675 cycles per minute instead of 675 cycles per second.

The present invention is based on a discovery concerning the physical characteristics of the polytetrafluoroethylene granular molding powder of the type prepared, for example, by the procedures referred to in U.S. Pat. No. 2,936,301. Such polytetrafluoroethylene granular molding powders are in the form of small, light, relatively nonporous particles. These particles are finely ground, i.e., have a wet sieve size, $d_{50}$, of less than $50\mu$. The wet sieve size is defined in the manner described in U.S. Pat. No. 2,936,301 in column 3, lines 21–49. This disclosure is herein incorporated by reference. Such molding powders, while having good molding properties, have poor powder flow resulting in a serious problem in utilizing automatic molding equipment. It has now been discovered that these polytetrafluoroethylene granular powders under certain conditions will form loose agglomerates which have far superior powder flow properties and which substantially retain the excellent molding properties of the granular powder. By loosely agglomerating these granular powders, the smoother exterior surface of the agglomerates permits superior powder flow. Since the agglomerates are loose in nature, they break down under molding pressure, thereby providing excellent moldability.

Further, fillers such as glass fibers, mica, bronze, carbon and the like, may be incorporated into the molding powder. Filler, if it is to be employed, is added before and intimately mixed with the resin during the deagglomeration operation. It has been found that the most satisfactory product contains about 10 to 40 volume percent of filler. The reagglomeration may be carried out by either a wet or a dry process. In the wet reagglomeration process, the finely ground resin is first deagglomerated to an average agglomerate size of less than 200 microns at a temperature between about 0 to 50° C. to break up any lumps caused by settling of the resin during storage or transit. The deagglomerated resin is then placed in a vessel having agitation means contained therein. In the vessel, the resin is slurried with a liquid such as water for from 30 to 120 minutes, and preferably about 60 minutes at temperatures of from 40 to 90° C.

In the dry reagglomeration process, the resin is first deagglomerated as set forth above. The deagglomerated resin is then placed in a cylinder mounted to rotate about its longitudinal axis at a constant rotational velocity selected to produce a resultant centripetal force on the wall of the cylinder of from 0.005 to 0.50 times the force of gravity. The cylinder is rolled for from about 10 to 30 minutes and preferably from 15 to 25 minutes while heat is applied to raise the final temperature of the resin to about 60 to 100° C.

The invention is more specifically illustrated and explained by means of the following comparative and illustrative examples which are not intended to be limiting.

Example 1

A 5.63-kg. charge of finely ground polytetrafluoroethylene granular molding powder, such as produced by the process disclosed and claimed in U.S. Pat. No. 2,936,301, was passed through a deagglomeration system comprising a 4-inch hammermill operating at 5000 r.p.m. and having an exit screen with 0.047-inch openings. The polymer was added to an 18-inch diameter tank which had a height of 18 inches and which was half full of water maintained at 80° C. The mixture was agitated for one hour at 352 r.p.m. using a 4-bladed, 9-inch agitator having a 45° downdraft. The resultant slurry was filtered, dried and sieved through a sieve having $1000\mu$ openings. Seventy percent of the product passed through the sieve and had the properties shown in the table.

Example 2

A 3.5-kg. charge of finely ground polytetrafluoroethylene granular molding powder, such as produced by the process disclosed and claimed in U.S. Pat. No. 2,936,301, was passed through the deagglomeration system of Example 1. The deagglomerated polymer was placed in a glass cylinder 12 inches long and having a diameter of 10.5 inches. The cylinder was then rolled about its longitudinal axis for 35 minutes at a speed of 11 r.p.m. The rotational speed was equivalent to a resulant centripetal force of 0.019 times the force of gravity on the wall of the cylinder. During the rolling, the cylinder and its contents were heated. The final temperature of the polymer was found to be between 65 and 70° C. The reagglomerated product was sieved as in Example 1. Forty-four percent of the product passed through the sieve and had the properties shown in the table.

Example 3

A 75-pound charge of finely ground polytetrafluoroethylene granular molding powder, such as produced by the process disclosed and claimed in U.S. Pat. No. 2,936,-301, was passed through a 12-inch hammermill operating at 3600 r.p.m. and having an exit screen with 0.066-inch openings. The deagglomerated polymer was placed in a horizontal cylindrical vessel 27 inches long and 21 inches in diameter having a heated jacket. The cylinder was then rotated about its longitudinal axis for 35 minutes at a speed of 8 r.p.m. The rotational speed is equivalent to a centripetal force of 0.019 times the force of gravity acting on the agglomerates during rotation. The final temperature of the polymer was found to be between 65 and 70° C. The reagglomerated product was sieved as in Example 1. Twenty-seven pounds passed through the sieve and had the properties shown in the table.

Example 4

The procedure of Example 3 was repeated substituting a cylinder r.p.m. of 18 (g. force=0.097) and a rolling time of 15 minutes. The final temperature of the polymer was 72° C. and it had the properties shown in the table.

Example 5

The procedure of Example 4 was repeated substituting a rolling time of 60 minutes. The final temperature of the polymer was 100° C. and it had the properties shown in the table.

Example 6

A charge of finely ground polytetrafluoroethylene granular molding powder produced in accordance with U.S. Pat. No. 2,936,301 was passed through the deagglomeration system of Example 1 and then without reagglomeration was subjected to the same tests as the product of Example 1. The properties are shown in the table.

Example 7

An aqueous polytetrafluoroethylene slurry, such as produced by the process disclosed in U.S. Pat. 2,393,967, was passed through a vibrating screen to remove adhesion polymer, and sufficient water was added until a ratio of polymer to water of 1:15 was obtained. The resulting slurry was passed through a cutting system comprising a commercially available water cutter (Fitzmall model K-14 cutter) equipped with a 1/16-inch screen. The cutter consists of a series of thick sharpened blades which rotate on a horizontal shaft at 1450 revolutions per minute. Polymer is pumped as a slurry into the top of the mill and passes through the cutting zone and out of the cutter when it has been reduced enough in size to pass through a screen at the lower end of the mill. The slurry was dewatered by passing over a vibrating 100 mesh screen, thereby separating impurities contained in the water from the polymer. The polymer was then again admixed with fresh water until a slurry concentration of water to polymer of 8:1 was obtained. The slurry was heated to a temperature of 50° C. for a period of eight hours while being agitated with a paddle agitator using a power of 10 HP/1000 gallons. The resulting slurry was dewatered and oversized agglomerates were removed. The polymer was then dried by suspending the polymer in a stream of hot air at a temperature of 120 to 180° C. moving at a linear velocity of 2000 to 2500 feet per minute. The product had the properties shown in the table.

Example 8

The tests of Example 4 were repeated using a charge of molding powder produced in accordance with U.S. Patent No. 3,087,921 and the properties are shown in the table.

Example 9

A charge of finely ground polytetrafluoroethylene granular molding powder produced in accordance with U.S. Pat. No. 2,936,301 was treated in an attempt to increase its powder flow following the disclosure of that patent by tumbling the powder through a rotating, three-inch diameter by four foot long "Pyrex" glass tube of which a 14-inch section is heated between 100 and 300° C. and a heating time of 5 to 30 minutes with a $g$ force of 0.39. The resulting material had poor handling properties and low apparent density. The process was continued until the powder had been passed through the unit six times. The final product had the properties shown in the table.

The data in the table show that the polymer of this invention as exemplified by Examples 1, 2, 3, 4, and 5 have both superior handling characteristics and superior physical properties in the molding. Particles that are hard (high values of CF as in Example 5) give uneven moldings of poor surface and somewhat inferior strength. However, the product of Example 5 is now considered acceptable as molding granules. The product from comparative Example 6 is unacceptable because the powder flow is nil and the very low apparent density limits piece size, putting requirements on equipment that cause higher costs, etc. The products of comparative Examples 7 and 8 have a good powder flow, but the moldability index is undesirably high; the tensile strength and elongation are undesirably low. Molded sheets from these products would be, at best, Grade C, based upon the United States Department of Commerce Commercial Standard, CS 239–63.

The product of comparative Example 9 has such a low apparent density, even after repeating the operation many times, that unacceptably high open space is required in pressing apparatus to obtain a suitable preform for subsequent treatment. It also has a crushing factor so low the particles will not retain their identity in the mechanical treatment experienced in automatic handling equipment.

The products of comparative Examples 6–9 do not produce acceptable molding granules.

TABLE

| | Properties of molding powder | | | | | | Properties of sintered articles | | |
|---|---|---|---|---|---|---|---|---|---|
| | $d_{50}$, microns | SSS, microns | CF | SSS/CF | AD. g./l. | PF. g./sec. | ΔSG | TS. p.s.i. | E. percent |
| Example number: | | | | | | | | | |
| 1 | 475 | 6.5 | 3.2 | 2.0 | 540 | 12 | 8.3 | 4,100 | 325 |
| 2 | 350 | 4.2 | 1.6 | 2.6 | 460 | 6.3 | 4.4 | 4,390 | 370 |
| 3 | 450 | 5.1 | 2.1 | 2.4 | 486 | 6.4 | 6.5 | 4,420 | 320 |
| 4 | 435 | 6.0 | 2.5 | 2.4 | 460 | 4.6 | 0 | 4,250 | 350 |
| 5 | 470 | 19 | 12 | 1.6 | 642 | 6.9 | 0 | 3,940 | 310 |
| 6[1] | 35 | 3.5 | .3 | 11.6 | 250 | 0 | 0.3 | 4,500 | 350 |
| 7[1] | 520 | 39–40 | 18–19.6 | 2.2 | 610 | 14 | 48 | 2,100 | 99 |
| 8[1] | 250–450 | >50 | ([2]) | ([2]) | 750–850 | 20 | 89 | 2,150 | [3] 180 |
| 9[1] | 420 | 3.5 | 0.5 | 7.0 | 315 | 0 | 8.6 | 4,000 | 450 |

[1] Comparative examples—not representative of invention.
[2] Not measurable.
[3] Rough surface.

The following examples each employ a single filler with finely ground polytetrafluoroethylene. However, this is merely for illustration and it must be understood that more than one filler could be used. The finely ground polytetrafluoroethylene is "Teflon" 7, the preparation of which is described in U.S. Pat. 2,936,301.

Example 10

A blend was made of 85 parts by weight of finely ground polytetrafluoroethylene granular molding powder, such as produced by the process disclosed and claimed in U.S. Pat. No. 2,936,301 and 15 parts by weight of glass fibers having an average size of approximately 6 to 8μ diameter by 200 to 500μ long. The rough blend was passed through the deagglomerating-blending operation of Example 1 to give an intimate blend of glass fiber and polymer. The mixture was placed in a glass jar 9.2 cm. in diameter and having a length of 16 cm. The jar was rotated on its longitudinal axis for one hour at 33 r.p.m. while being heated with an infrared lamp. The speed of rotation is equivalent to a centripetal force of 0.056 times the force of gravity. The final temperature was 76° C. After sieving through 18 mesh, the properties below were determined:

$d_{50}$, 450μ;
powder flow, 10.2 grams/sec.;
sub-sieve size, 7.4μ;
CF, 2.1;
apparent density, 474 grams/liter.

Example 11

A charge consisting of 965 g. of finely ground polytetrafluoroethylene and 170 g. of commercially available particulate graphite (Acheson GP 38) was admixed and passed through a commercially available disintegrator (Rietz Model RA-1) which was operating at 5000 r.p.m. at about 30° C., and which employed a sizing screen with holes 0.047-inch in diameter. The resulting mixture tended to form large agglomerates readily and did not flow freely. This mixture had a CF of 0.5, TS of 2160 p.s.i., and SSS of 4.1$\mu$.

A charge consisting of 378 g. of this mixture was placed in a 4-liter stainless steel beaker containing 2500 ml. of water. The beaker was equipped with two baffles. The beaker was heated to 80° C. by immersion in a hot water bath. The mixture in the beaker was agitated for four hours by a two-bladed paddle operating at 750 r.p.m. Water was drained from the resin which was then dried for 16 hours at 125° C. in air. The dry resin was then fractionated on a U.S. No. 14 mesh sieve, through which passed 85% of the resin. The portion of resin which passed through the sieve had a PF of 21 g./sec.; E of 164%; CF of 6.7; TS of 1750 p.s.i.; AD of 606 g./l. and SSS of 11.4$\mu$.

Example 12

A charge consisting of 375 g. of a commercially available glass fiber (Owens-Corning Fiberglas 709-water binder) was mixed with one quart of petroleum ether and 30 ml. of an organic $TiO_2$ forming titanate which hydrolyzed to form a $TiO_2$ film on the glass fibers and placed in a 5-liter round bottom flask and stirred for one-half hour to room temperature. The solvent was evaporated and the resultant product was heated in a humid oven at 50° C. for six hours. Fifty-three grams of the pretreated glass fibers were mixed with 300 grams of finely ground polytetrafluoroethylene resin and run through a high-speed hammermill. The resultant powder was introduced into a stainless steel, baffled beaker containing 2500 ml. of distilled water. The slurry was stirred at 80° C. for three hours. The resulting product was dried for 17 hours at 125° C. The dried product had an ultimate elongation of 269% and a tensile strength of 3200 p.s.i. It was a free-flowing powder which had an apparent density of 600 grams/liter.

Example 13

A charge consisting of 75 g. of glass fibers, 750 ml. water, 0.75 g. vinyl trichlorosilane and 0.19 ml. of 50% NaOH solution was stirred for ten minutes in a one-liter beaker. The solution was decanted and the product dried for ten minutes at 150° C. under vacuum. Fifty-three grams of this product and 300 grams of finely ground polytetrafluoroethylene resin were passed through a high-speed hammermill and then stirred with water at 80° C. according to the procedure of Example 12 for three hours. The product was dried for 17 hours at 125° C. The portion of the product which passed through a U.S. 14 mesh screen was a free-flowing powder, had tensile properties of 247% ultimate elongation and 2690 p.s.i. tensile strength. The apparent density was 650 grams/liter.

Example 14

Fifty-three grams of a commercially available glass fiber (Owens-Corning Type 701 Fiberglas) having a cationic binder was hand mixed with 300 g. of finely ground polytetrafluoroethylene and then passed through a high-speed hammermill. The product was then added to the system described in Example 12. The temperature was 80° C. and the time was three hours. The product was dried at 125° C. for 17 hours. The result was a free-flowing powder which passed through a U.S. 14 mesh screen. The ultimate elongation was 248% and the tensile strength was 2800 p.s.i. The apparent density was 578 grams/liter.

Example 15

Three hundred grams of powdered bronze was mixed with 200 grams of finely ground polytetrafluoroethylene resin. The crude mixture was subsequently passed through a hammermill to achieve deagglomeration and intimate blending of the ingredients.

After this treatment, the powder was placed in a four-liter stainless steel, baffled beaker containing 2500 ml. water at 80° C. The polytetrafluoroethylene/bronze mixture was slurried at approximately 1000 r.p.m. for a period of two hours at 80° C. with a paddle agitator located near the bottom of the vessel.

The composition, now in the form of stable pellets, the majority of which are less than 1200 microns in diameter, was dried for 15 hours at 125° C.

Subsequent to drying, the material was classified through a 16 mesh U.S. standard sieve, yielding a free-flowing pelletized bronze - tetrafluoroethylene molding composition with a maximum particle size of 1168 microns, an apparent density of 1035 grams/liter, a compaction ratio of 3.4:1, and a bronze content of approximately 58.6% (based on tetrafluoroethylene pyrolysis).

Moldings exhibited a tensile strength of 1815 p.s.i. with 98% ultimate elongation.

Example 16

Conditions similar to those in Example 15 were employed with the exception that 0.66% (based on bronze) of 2-mercapto-6-ethoxybenzothiazole (flotation agent) was added to the tetrafluoroethylene-bronze mixture prior to blending in the hammermill.

The resulting product was a free-flowing, bronze-tetrafluoroethylene molding powder with a maximum particle size of 1168 microns, an apparent density of 1096 grams/liter, a compaction ratio of 3.3 to 1, and a bronze content of approximately 58.2% (based on tetrafluoroethylene pyrolysis).

Moldings exhibited tensile strengths of 2035 p.s.i. with 56% ultimate elongation.

Example 17

Conditions similar to those employed in Example 15 were employed with the exception that the bronze powder was pretreated before mixing with the tetrafluoroethylene resin.

Treatment of the bronze powder involved treating 300 grams of powdered bronze with three grams (1%) of an organic titanate compound ("Tyzor" PB) in 100 ml. naphtha. Subsequent to slurrying the bronze powder in the naphtha solution, the naphtha was removed under vacuum. Hydrolysis of the organic titanate gave $TiO_2$ coated material which was dried, mixed with finely ground polytetrafluoroethylene and reagglomerated.

Product properties included:

Free-flowing powder,
Maximum particle size—1168 microns,
Apparent density—1028 grams/liter,
Compaction ratio—3.5 to 1, and
Bronze content—62.0%.

Moldings exhibited a tensile strength of 1305 p.s.i. and an ultimate elongation of 123%.

Example 18

Fifty-three grams of mica powder was hand mixed with 300 grams of finely ground polytetrafluoroethylene. The mixture was then run through a high-speed hammermill. The powdered product was then added to the agitated slurry system described in Example 12, to which 0.26 g. of cetyl trimethyl ammonium bromide had been added and wherein the temperature was 80° C. and the slurrying time was three hours. The pelletized product was dried at 125° C. for 17 hours. The result was a free-flowing powder of which 98% passed through a U.S. 14 mesh screen. The tensile strength for 480 p.s.i. and the ultimate elongation was 5%. The apparent or bulk density was 580 grams/liter. 10.66 grams of mica had been lost in the reagglomeration process. PF of the product equals 10.4 g./sec.

Example 19

One hundred and twenty grams of powdered mica, 10 ml. of an organic titanate compound and 700 ml. of petroleum ether were stirred for one-half hour in a 2-liter round bottom flask. The solvent was vacuum evaporated and the product was humid heat treated at 60° C. for two hours. Fifty-three grams of this treated mica were hand mixed with 300 grams of finely ground polytetrafluoroethylene. The mixture was processed through a high-speed hammermill. The powder was then treated in the same manner as in Example 18. The product, 95% of which passed through a U.S. 14 mesh screen, was a free-flowing powder with tensile strength of 800 p.s.i. and an ultimate elongation of 10%. The apparent density was 500 grams/liter. 8.2 grams of mica had been lost in the reagglomeration process. PF of the product equals 16.4 g./sec.

Example 20

A mixture of 40 parts by weight of the product of U.S. Pat. No. 2,936,301 and 60 parts by weight (27% bronze by volume) of 90–10 bronze powder designated as MD 101 by Martin-Marietta Company was deagglomerated and mixed in a four-inch hammermill of the type used in Example 1. The mixture was then tumbled in a cylindrical glass vessel, 9.9 cm. in diameter at a g force of 0.06, for one hour and fifteen minutes while being heated to 65° C. After sieving through an 18-mesh screen, the product had a powder flow index of 26 grams/sec., an apparent density of 1012 grams per liter, and a crushing factor of 3.8. Moldings had tensile strength of 2080 p.s.i. with an ultimate elongation of 90%. This is an excellent value for compositions containing this much filler. The apparent density is equivalent to a compaction ratio of 3.9.

Example 21

Fifty-three grams of a commercially available glass fiber (Owens-Corning Type 701 Fiberglas) having a cationic binder was hand mixed with 300 g. of finely ground polytetrafluoroethylene and then run through a high-speed hammermill. The product was then added to the system described in Example 12. To this mixture was added 0.25 g. of cetyl trimethyl ammonium bromide. This mixture was agitated at 80° C. for three hours. The product was dried at 125° C for 17 hours. The result was a free-flowing powder which passed through a U.S. 14 mesh screen. The tensile strength was 2800 p.s.i. The apparent density was 545 grams/liter. No glass separated from the polytetrafluoroethylene in the slurry tank. By comparison, in Example 14, 1.7 grams of the glass fibers remained in the slurry tank.

We claim:

1. A polytetrafluoroethylene molding powder, said molding powder having
   (a) an apparent density of about 400 to about 1100 grams per liter;
   (b) a powder flow index of at least four grams per second; and
   (c) composed of agglomerates of finely ground polytetrafluoroethylene resin, said finely ground polytetrafluoroethylene resin having an average size of less than 200 microns.

2. A molding powder according to claim 1 having a crushing factor of at least one and less than 12.

3. A molding powder according to claim 2 having a sub-sieve size divided by crushing factor of less than 3.

4. A molding powder according to claim 1 having from 10 to 40 volume percent filler incorporated in said agglomerates.

5. A molding powder containing polytetrafluoroethylene according to claim 4 having a compaction ratio of at least 3.0 and less than 5.5.

6. Process of preparing a molding powder containing polytetrafluoroethylene from finely ground polytetrafluoroethylene resin which comprises:
   (a) deagglomerating said resin at a temperature of 0 to 50° C. until an average size of less than 200 microns is obtained; and
   (b) reagglomerating by agitating the resin in water for at least 30 minutes at a temperature of 40° to 90° C.

7. Process according to claim 6 in which there is blended with the polytetrafluoroethylene resin a hydrophilic filler which is pretreated with an agent capable of imparting hydrophobic properties thereto.

8. Preparing a filled polytetrafluoroethylene molding powder from granular, irregular shaped, finely ground polytetrafluoroethylene resin and a hydrophilic filler by a process comprising:
   (a) deagglomerating said resin and said filler in the presence of an agent capable of imparting hydrophobic properties to said filler at a temperature of 0 to 50° C. with a rotating cutting surface until an average particle size of less than 200 microns is obtained; and
   (b) reagglomerating the resultant filled resin as an aqueous slurry at a temperature of 40° to 90° C. to form loose agglomerates.

9. A process for preparing a high strength granular polytetrafluoroethylene molding powder having superior powder flow comprising agglomerated particles having an average size, wet-sieve, within the range of about 350–475 microns, which comprises subjecting a fine granular polytetrafluoroethylene powder having an average particle size, wet-sieve, of less than 200 microns to agitation in a medium consisting of water, the fine granular powder to water ratio being in the range 0.74 to 1.25 pounds per gallon at a temperature above 40° C. until agglomeration occurs and separating the resulting agglomerates from the water medium.

10. The process of claim 9 wherein the fine granular powder has an average particle size, wet-sieve, of no greater than about 50 microns.

11. The process of claim 10 wherein the fine granular powder comprises particles prepared by the reduction of coarse granular resin in an air mill.

12. The process of claim 10 wherein the water medium is maintained at a temperature in the range of about 40° to 90° C.

13. The process of claim 10 wherein the power input is about 0.01 horsepower per gallon of water medium.

14. A free-flowing granular polytetrafluoroethylene molding powder comprised of agglomerates of particles of a finely pulverized granular polytetrafluoroethylene powder having an air sedimentation size of less than 50 microns, said agglomerates having a wet-sieve size in the range of from 350–475 microns; an apparent density in the range of from 400 to 700 grams/liter; an uncompacted flow rating of at least 25; a compacted flow rating of at least 9; said agglomerates being sufficiently hard to withstand normal handling without disintegration but readily deformable under preforming pressure to produce essentially pore-free moldings retaining at least 80% of the tensile strength of moldings produced from the original finely-pulverized powder.

15. A free-flowing granular polytetrafluoroethylene molding powder comprised of agglomerates of particles of a finely pulverized granular polytetrafluoroethylene powder having an air sedimentation size of less than 50 microns, said agglomerates having a wet-sieve size in the range of from 350–475 microns; a bulk density in the range of from 400–700 grams/liter; an uncompacted flow rating of at least 36; a compacted flow rating of at least 16; said agglomerates being sufficiently hard to withstand normal handling without disintegration but readily deformable under preforming pressures to produce essentially pore-free moldings retaining at least 80% of the tensile strength of moldings produced from the original finely-pulverized powder.

References Cited

UNITED STATES PATENTS

| | | | |
|---|---|---|---|
| 3,115,486 | 12/1963 | Weisenberger | 260—92.1 S |
| 2,936,301 | 5/1960 | Themal et al. | 260—92.1 S |
| 2,593,583 | 4/1952 | Lantz | 260—92.1 S |
| 3,087,921 | 4/1963 | Mathews, Jr. | 260—41 R |

MORRIS LIEBMAN, Primary Examiner

S. L. FOX, Assistant Examiner

U.S. Cl. X.R.

260—92.1 S